United States Patent
Cheng

(10) Patent No.: US 7,324,243 B2
(45) Date of Patent: Jan. 29, 2008

(54) FLUORESCENT COLOR SCANNING METHOD FOR USE IN A SCANNER

(75) Inventor: Long-Song Cheng, Hsinchu (TW)

(73) Assignee: Microtek International Inc., Hsinchu (TW)

( * ) Notice: Subject to any disclaimer, the term of this patent is extended or adjusted under 35 U.S.C. 154(b) by 890 days.

(21) Appl. No.: 10/699,931

(22) Filed: Nov. 4, 2003

(65) Prior Publication Data
US 2005/0094168 A1 May 5, 2005

(51) Int. Cl.
*H04N 1/387* (2006.01)
*G06K 9/03* (2006.01)

(52) U.S. Cl. ............ 358/461; 382/167; 382/273; 382/274; 382/318

(58) Field of Classification Search ............ 358/462, 358/474, 475, 487, 494, 497, 1.9, 504, 509, 358/518, 461; 382/273, 318, 319, 274, 162, 382/167; 356/444; 359/204, 205
See application file for complete search history.

(56) References Cited

U.S. PATENT DOCUMENTS 5,453,850 A * 9/1995 Akuzawa et al. .......... 358/475
6,486,974 B1 * 11/2002 Nakai et al. ................ 358/1.9
2002/0002410 A1 * 1/2002 Tomita et al. ............... 700/67
2003/0039359 A1 * 2/2003 Thierauf ...................... 380/54

* cited by examiner

*Primary Examiner*—King Y. Poon
*Assistant Examiner*—Peter L Cheng
(74) *Attorney, Agent, or Firm*—Rosenberg, Klein & Lee

(57) ABSTRACT

A fluorescent color scanning method is disclosed to include the steps of: scanning a standard white to obtain a first reference white W1; reducing the scanning brightness and then scanning the standard white to obtain a second reference white W2; using the first reference white and second reference white to scan every scanning document and then storing the respective scanning results Pm and Qm; and comparing Qm to W2 so as to determine if the document contains a fluorescent color or not subject to: (i) determining that the document contains a fluorescent color if Qm>W2, and then converting Qm into the accurate color output Om; and (ii) determining that the document contains no fluorescent color if Qm≦W2 and then using the value of Pm as the image output value.

6 Claims, 4 Drawing Sheets

FLUORESCENT COLOR SCANNING METHOD FOR USE IN A SCANNER

BACKGROUND OF THE INVENTION

1. Field of the Invention

The present invention relates to the scanning operation of an optical scanner and, more specifically to a fluorescent color scanning method used in a scanner to accurately scan documents containing fluorescent substances.

2. Description of the Related Art

Following fast development of computer technology, the trend of office automation keeps going forward. To achieve office automation, it is necessary to scan paper documents into electronic files for transmission by E-mail through a network.

Because of the attractively bright-colored feature, fluorescent substance is intensively used in a variety of documents, for example, used in ink for color printer, paper, and fluorescent markers. However, because the radiance factor of regular commercialized fluorescence is over 1 under visible spectrum, it is difficult to accurately obtain the original fluorescent color by means of conventional scanning methods. FIG. 1 is a radiance factor-wavelength curve obtained from a salmon fluorescent substance under a standard light source A subject to CIE (Commission Internationale de l'Eclairage). As illustrated, the radiance factor of the fluorescent substance is about 1.25 at wavelength 610 nm, which is much higher than the radiance factor of the reference substance of standard white used in scanners (i.e., whiteboard). Therefore, when scanning this salmon fluorescent substance with a scanner, a saturated phenomenon occurred at the photon received by the red color sensor, or at the converted signal, thereby causing a signal ratio distortion at the red color, green color and blue color sensors that control color tone and hue. Therefore, there are differences between the color tone and hue of the image scanned and the original document.

SUMMARY OF THE INVENTION

The present invention has been accomplished under the circumstances in view. It is therefore the main object of the present invention to provide a fluorescent color scanning method, which eliminates color distortion. It is another object of the present invention to provide a fluorescent color scanning method, which accurately judges the presence of a fluorescent color in the document. It is still another object of the present invention to provide a color conversion method, which enables the scanner to produce accurate color output.

To achieve these and other objects of the present invention, the fluorescent color scanning method comprises the steps of: (a) using a light source of a predetermined brightness to scan a standard white so as to obtain a first reference white $W1(R,G,B)$ in which R indicates red color; G indicates green color; B indicates blue color; (b) reducing the brightness of said light source, and then scanning said standard white to obtain a second reference white $W2(R,G,B)$; (c) using said first reference white $W1(R,G,B)$ as the standard to scan every scanning point and then storing the scanned result of each scanning point by means of $Pm(R,G,B)$, in which m=1, 2, 3 . . . , m that represents the respective scanning point; (d) using said second reference white $W2(R,G,B)$ as the standard to scan every scanning point of the document to be scanned and then storing the scanned result of each scanning point by means of $Qm(R,G,B)$; and (e) comparing the value of $W2(R,G,B)$ to the value of $Qm(R,G,B)$, so as to determine if the document contains a fluorescent color or not subject to: (i) determining that the document contains a fluorescent color if $Qm(R)>W2(R)$, $Qm(G)>W2(G)$, or $Qm(B)>W2(B)$, and then converting said $Qm(R,G,B)$ into the accurate color output $Om(R,G,B)$ based on said $W1(R,G,B)$ through a conversion method, and (ii) determining that the document contains no fluorescent color if $Qm(R) \leq W2(R)$, $Qm(G) \leq W2(G)$, and $Qm(B) \leq W2(B)$, and then using the value of $Pm(R,G,B)$ as the image output value.

BRIEF DESCRIPTION OF THE DRAWINGS

The accompanying, drawing is included to provide a further understanding of the invention, and is incorporated in and constitutes a part of this specification. The drawing illustrates an embodiment of the invention and, together with the description, serves to explain the principles of the invention. In the drawing.

DETAILED DESCRIPTION OF THE PREFERRED EMBODIMENT

In order to have the scanner show accurate chroma and hue when scanning a fluorescent color, the invention detects the presence of a fluorescent color in document by means of reducing the scanning brightness. In case document contains a fluorescent color, the scanning result is converted through a proper conversion before output, so that the output image has the accurate color.

Figure 1:
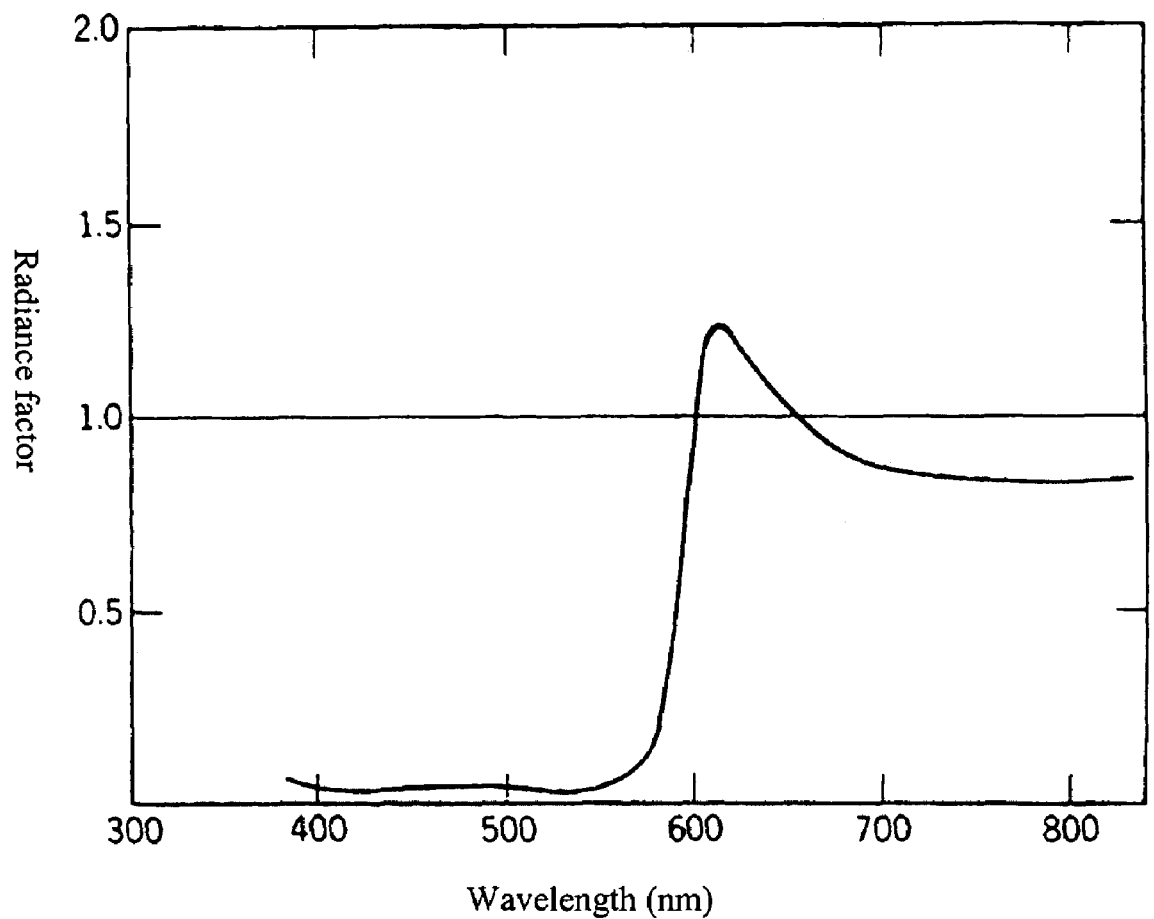
FIG. 1 is a radiance factor-wavelength curve obtained from a salmon fluorescent substance under a standard light source A subject to CIE.
Figure 2:
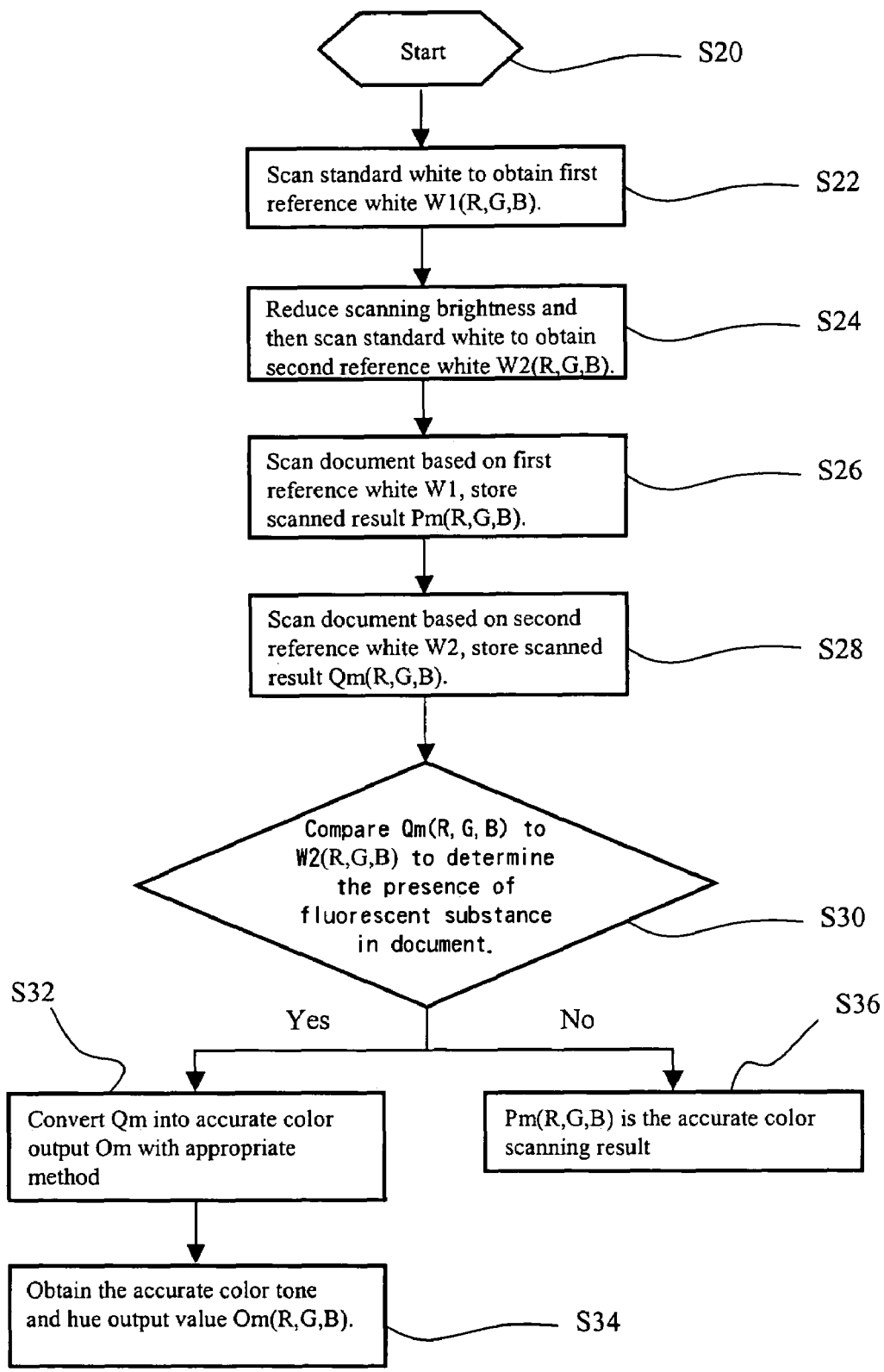
FIG. 2 is a flow chart of the present invention.

Referring to FIG. 2, the fluorescent color scanning method in accordance with the present invention is shown comprising the steps of:

S20 starting the scanner;

S22 scanning a whiteboard of standard white to obtain a first reference white $W1(R,G,B)$, i.e., scanning the brightest point of scanning reference, for example $W1(R,G,B)$ set to be (255,255,255) for pixel of 8 bits;

S24 reducing the brightness of the light source or the brightness of the light entered the scanner, and then scanning the whiteboard of standard white to obtain a second reference white $W2(R,G,B)$, which has a value smaller than the value of $W1(R,G,B)$;

S26 scanning the picture of the document based on the standard of $W1(R,G,B)$, and then storing the scanned result in $Pm(R,G,B)$;

S28 scanning the picture of the document based on the standard of $W2(R,G,B)$, and then storing the scanned result in $Qm(R,G,B)$;

S30 comparing the value of $Qm(R,G,B)$ to the value of $W2(R,G,B)$, so as to determine if the document contains a fluorescent color or not, and then proceeding to step S32 if positive, or step S36 if negative;

S32 converting the scanning result $Qm(R,G,B)$ into the accurate color output $Om(R,G,B)$ based on $W1(R,G,B)$ when $Qm(R)>W2(R)$, $Qm(G)>W2(G)$, or $Qm(B)>W2(B)$;

S34 obtaining the accurate color tone and hue output value $Om(R,G,B)$ in which; $Om(R)=Um(R)*W1(R)$; $Om(G)=Um(G)*W1(G)$; $Om(B)=Um(B)*W1(B)$;

S36 $Pm(R,G,B)$ being the accurate color scanning result.

In the aforesaid step S30, determining the presence of a fluorescent color in document is determined subject to the result of comparing $Qm(R,G,B)$ to $W2(R,G,B)$, i.e., document is confirmed containing a fluorescent color if $Qm(R)>W2(R)$, $Qm(G)>W2(G)$, or $Qm(B)>W2(B)$. In this case, one color sensor is saturated: Therefore, the scanning result must be properly converted to provide the accurate chroma and hue before output. However, if $Qm(R) \leq W2(R)$, $Qm(G) \leq W2(G)$, and $Qm(B) \leq W2(B)$, it means no fluorescent color in document. In this case, proceed to step S36, i.e., $Pm(R,B,G)$ is the accurate scanning result.

In the aforesaid step S32, the conversion is achieved by: setting Bm to be the maximum value of $Qm(R)$, $Qm(G)$, and $Qm(B)$ and then calculating the ratio of each color $Um(R,G,B)$ in which $Um(R)=Qm(R)/Bm$; $Um(G)=Qm(G)/Bm$; $Um(B)=Qm(B)/Bm$. Based on $W1(R,G,B)$, obtain the accurate color tone and hue output value $Om(R,G,B)$ in which; $Om(R)=Um(R)*W1(R)$; $Om(G)=Um(G)*W1(G)$; $Om(B)=Um(B)*W1(B)$.

Figure 3:
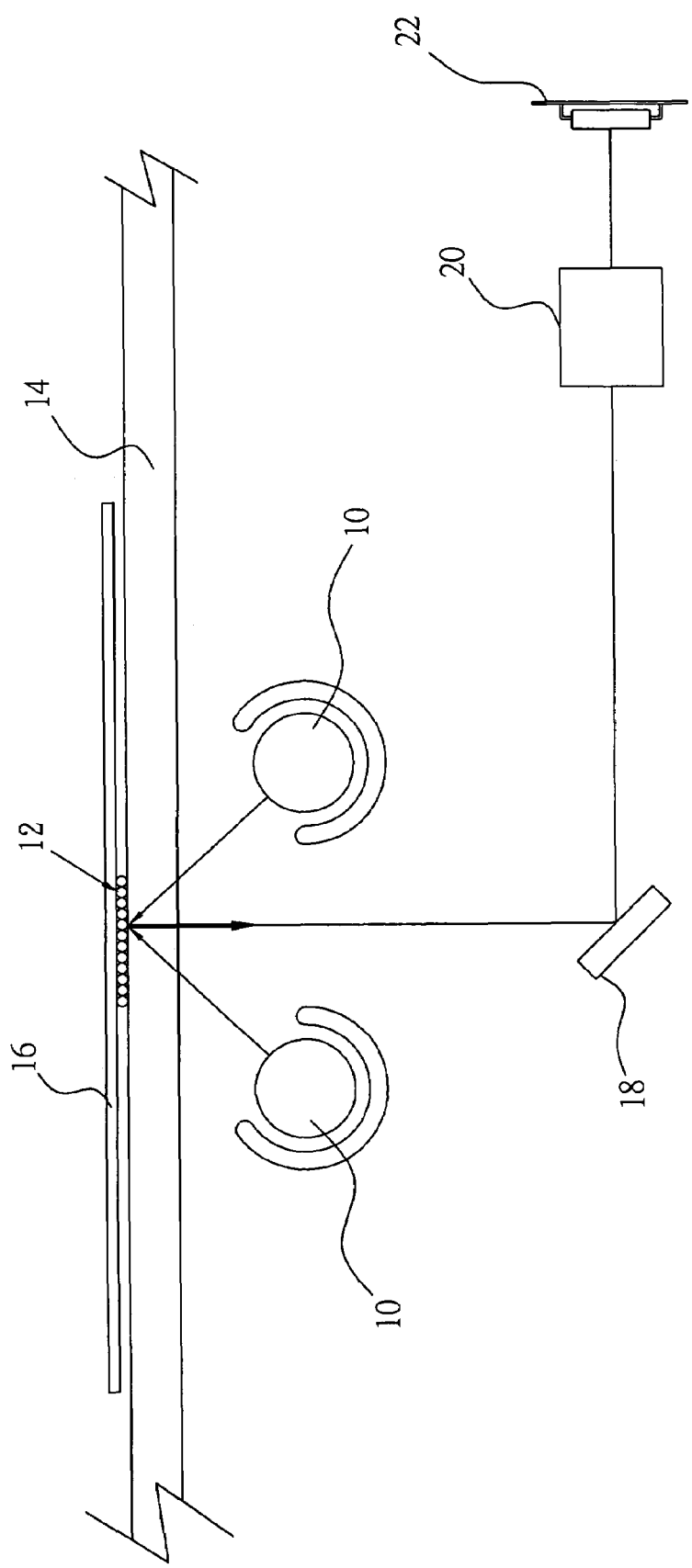
FIG. 3 illustrates the architecture of a scanner constructed according to the present invention.
Figure 4:
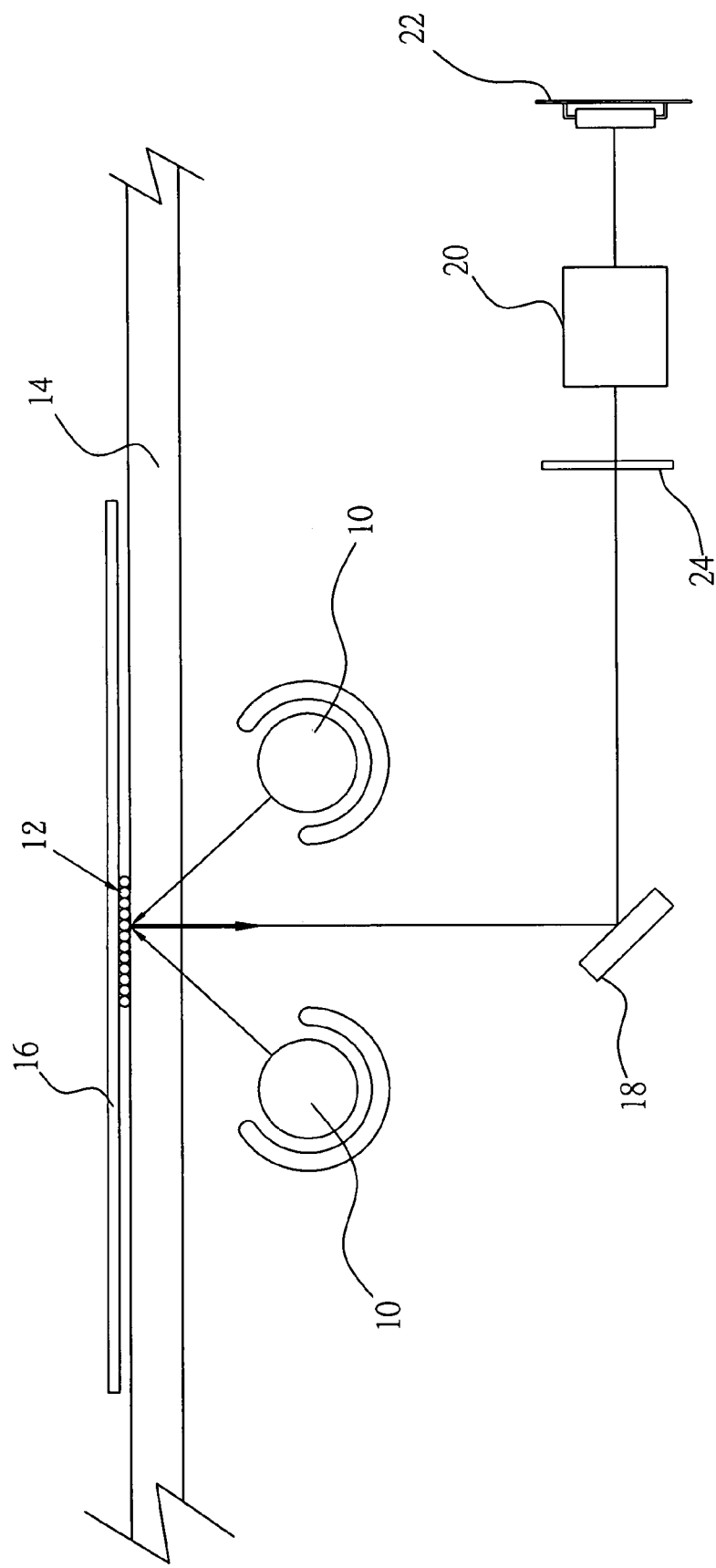
FIG. 4 is a schematic drawing of a scanner showing a neutral density filter set in front of the lens according to the present invention.

In the aforesaid method, fluorescent color scanning is achieved by means of the application of different brightness (light intensity). There are various methods to reduce scanning brightness. Hereinafter describes one example. FIG. 3 illustrates the architecture of a scanner, which comprises two lamps (light sources) 10. The document 12 is placed on the glass window 14 and then covered by the top cover 16 of the scanner. When scanning the document 12, light from the light sources 10 is reflected by the document 12 into reflected light, which passes through a reflector 18 into the lens 20 of the scanner. Thus, the image sensor module 22 of the scanner picks up light signal from the lens 20. Therefore, the two lamps 10 can be simultaneously turned on and then the scanning procedure is started to obtain a first reference white W1 and Pm, and then one lamp 10 is turned off and then the scanning procedure is started again to obtain a second reference white W2 and Qm. Alternatively, as shown in FIG. 4, a neutral density filter 24 may be set in front of the lens 20 to reduce the scanning brightness. In another way, a control circuit may be used to control the exposure time of each color sensor of the image sensor module so as to regulate the scanning brightness.

As indicated above, the method of the present invention enables the scanner to accurately scan fluorescent colors. By means of the present invention, only a slight change to the architecture or control circuit of the original scanner is needed. This minor architecture or control circuit change does not increase the cost much while improving the scanning quality and increasing the added value of the scanner. Therefore, the invention has an industrial value.

A prototype of fluorescent color scanning method has been constructed with the features of FIGS. 2~4. The fluorescent color scanning method functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A fluorescent color scanning method comprising the steps of:
    (a) using a light source of a predetermined brightness to scan a standard white so as to obtain a first reference white $W1(R,G,B)$ in which R indicates red color; G indicates green color; B indicates blue color;
    (b) reducing the brightness of said light source, and then scanning said standard white to obtain a second reference white $W2(R,G,B)$;
    (c) using said first reference white $W1(R,G,B)$ as the standard to scan every scanning point and then storing the scanned result of each scanning point by means of $Pm(R,G,B)$, in which m=1, 2, 3 . . . , m that represents the respective scanning point;
    (d) using said second reference white $W2(R,G,B)$ as the standard to scan every scanning point of a document to be scanned and then storing the scanned result of each scanning point by means of $Qm(R,G,B)$; and
    (e) comparing the value of $Qm(R,G,B)$ to the value of $W2(R,G,B)$, so as to determine if the document contains a fluorescent color or not subject to:
        (i) determining that the document contains a fluorescent color if $Qm(R)>W2(R)$, $Qm(G)>W2(G)$, or $Qm(B)>W2(B)$, and then converting said $Qm(R,G,B)$ into the accurate color output $Om(R,G,B)$ based on said $W1(R,G,B)$ through a conversion method, and
        (ii) determining that the document contains no fluorescent color if $Qm(R) \leq W2(R)$, $Qm(G) \leq W2(G)$, and $Qm(B) \leq W2(B)$, and then using the value of $Pm(R,G,B)$ as the image output value.

2. The fluorescent color scanning method as claimed in claim 1, wherein the conversion method used in step (e) is to set Bm to be the maximum value of $Qm(R)$, $Qm(G)$, and $Qm(B)$ and then calculate the ratio of each color $Um(R,G,B)$ in which $Um(R)=Qm(R)/Bm$; $Um(G)=Qm(G)/Bm$; $Un(B)=Qm(B)/Bm$; the image output value of $Om(R,G,B)$ is set to be $Om(R)=Um(R)*W1(R)$, $Om(G)=Um(G)*W1(G)$, and $Om(B)=Um(B)*W1(B)$.

3. The fluorescent color scanning method as claimed in claim 1, wherein said light source is comprised of two lamps.

4. The fluorescent color scanning method as claimed in claim 3, wherein the step (b) reducing the brightness of said light source is to turn off one of said two lamps.

5. The fluorescent color scanning method as claimed in claim 1, the step (b) reducing the brightness of said light source is to put a neutral density filter in front of the lens of said scanner.

6. The fluorescent color scanning method as claimed in claim 1, the step (b) reducing the brightness of said light source is to reduce the exposing time of every color sensor of the image sensor module of the scanner.

* * * * *